_United States Patent_ [19]

Liu

[11] 4,368,483
[45] Jan. 11, 1983

[54] VIDEO SIGNAL DEFECT REPLACEMENT CIRCUITRY

[75] Inventor: Frank C. Liu, Phoenix, Ariz.

[73] Assignee: RCA Corporation, New York, N.Y.

[21] Appl. No.: 276,011

[22] Filed: Jun. 22, 1981

[51] Int. Cl.³ .................... H04N 9/535; H04N 5/21
[52] U.S. Cl. .................................. 358/36; 358/37; 358/166; 358/167; 358/314
[58] Field of Search ............... 358/8, 21 R, 36, 37, 358/160, 166, 167, 213

[56] References Cited

U.S. PATENT DOCUMENTS

| 2,996,576 | 8/1961 | Dolby | 178/6.6 |
|---|---|---|---|
| 3,463,874 | 8/1969 | Hodge et al. | 178/5.4 |
| 3,919,468 | 11/1975 | Weimer | 358/213 |
| 3,952,326 | 4/1976 | Rotter | 358/8 |
| 4,032,966 | 6/1977 | Kenney et al. | 358/8 |
| 4,079,423 | 3/1978 | Diehl | 358/213 |
| 4,106,063 | 8/1978 | Lackner et al. | 360/38 |
| 4,122,489 | 10/1978 | Bolger et al. | 358/21 |
| 4,140,923 | 2/1979 | Herrmann | 307/221 |
| 4,250,521 | 2/1981 | Wright | 358/8 |
| 4,272,785 | 6/1981 | Fuhrer | 358/127 |

_Primary Examiner_—Robert L. Richardson
_Attorney, Agent, or Firm_—E. M. Whitacre; J. S. Tripoli; E. P. Herrmann

[57] ABSTRACT

A video defect compensator is provided which develops a replacement or substitution video signal for use during a defect in the signal normally being displayed. The substitution signal is generated by averaging four picture points in the vicinity of the displayed picture point, two from the television line preceding the line currently being displayed and two from the television line succeeding the line currently being displayed. The four picture points are made available by utilizing a 2H delay line and wherein the line currently displayed is delayed by one TV line. Two signals temporally displayed by one color subcarrier period and delayed from the current signal by 1H are summed. Two signals temporally displaced by one color subcarrier period and preceding the currently displayed signal by 1H are also summed. The two sets of summed signals are then combined and divided by four to produce a replacement signal which is the average of four picture points.

3 Claims, 3 Drawing Figures

VIDEO SIGNAL DEFECT REPLACEMENT CIRCUITRY

BACKGROUND OF THE INVENTION

This invention relates to a signal noise/defect compensator applicable for use in a system for reproducing recorded or broadcast television image information.

Defects in television image information signals produce objectionable picture characteristics in the reproduced image in the form of bright or dark lines or spots. In broadcast TV signals these defects arise from RF interference which impose noise impulses on the transmitted signals. A familiar manifestation of such noise are the bright flashes which occur on the TV display when an electric motor such as a hair dryer is operated in the vicinity of a TV receiver. With respect to video signal recovered from a recorded medium, e.g., playback of a VTR or a video disc, defects arise from loss of portions of the recorded signal due to defects in the record. These defects are referred to in the recording arts as dropouts and produce streaks in the displayed picture. Whether the defects arise from noise or dropouts they are susceptible of detection prior to display of the image so that corrective action may be taken to reduce objectionable manifestations.

Television image information is generally redundant line to line. It is therefore possible to substitute segments of signal from adjacent image lines in place of defective signal segments. Known defect compensators of this type, as shown in U.S. Pat. No. 2,996,576, store image information from a previous line and insert the stored previous line of information, or a portion thereof, into the video signal when a signal defect occurs. This process is relatively simple for black and white TV signal but becomes more complicated with respect to composite color signals. Color TV signals include a wide band luminance signal and a phase modulated color subcarrier. The color subcarrier, however, occurs with a 180 degree phase difference from line to line. This phase difference precludes direct signal substitution between adjacent lines for defect compensation purposes because the substituted color information would be incorrectly reproduced. Fuhrer in U.S. Pat. No. 4,272,785 filed June 1, 1979 and assigned to the present assignee, solved the color phase reversal problem by substituting an average signal from a previously stored line. This is accomplished by averaging signal from two picture points displaced from the defective point by approximately ± one-half of the color subcarrier period. This results in a signal having a color subcarrier in phase with an adjacent line and a luminance signal which approximates the average of the luminance signal over a color subcarrier period. Bolger et al., U.S. Pat. No. 4,122,489 (incorporated herein by reference) produced a similar result by generating a substitution signal which is the average of four picture points, two taken from a succeeding image line and two from a preceding image line to the image line currently being displayed.

The Bolger et al. apparatus comprises two serially connected 1H delay lines. The signal normally displayed is acquired from the output of the first 1H delay line, and then delayed by a one-half color subcarrier period in a third delay element. The substitution signal is generated by first summing the input and output video signal of the serially connected two 1H delay lines, the resultant signal being the sum of two vertically aligned picture points from a first and third horizontal line. The summed signal is delayed one color subcarrier in a fourth delay circuit. The summed signal and the summed signal delayed by one color subcarrier period are then summed to produce the substitution signal. The fourth delay element temporally aligns two picture points along the horizontal lines separated by one color subcarrier period and thereby effects the summing of a total of four picture points. The total summed signal is then divided by four to produce a signal equal to the average signal of the four picture points. Note the third delay element creates a 180 degree phase delay in the color signal normally displayed rendering it in phase with the color signal of the substitution signal.

SUMMARY OF THE INVENTION

The present invention is an improved circuit arrangement for generating a four point average defect substitution signal. The invention comprises a 2H tapped delay line having first and second taps at the input end of the delay line which taps are arranged to access signals which are temporally separated by one color subcarrier period, a third tap for accessing signal temporally separated from the first tap by 1H plus one-half a subcarrier period, and fourth and fifth taps for accessing signal respectively delayed a 2H period from the first and second taps. Signal for normal display is taken from the third tap. Signal from the first and second taps are summed in a first ADDER circuit and signal from the fourth and fifth taps are summed in a second ADDER circuit. The summed signals from the first and second ADDER circuits are subsequently summed in a third ADDER circuit and divided by four to produce an average signal from four picture points for signal substitution when defects occur in the signal taken from the third tap.

The advantages of the present invention will be appreciated from the following comparison with the Bolger et al. arrangement. All of the requisite delay elements are realized in a common delay element, thus all of the tapped signals will undergo similar signal processing. In contrast, the fourth delay element of the Bolger et al. circuit may impose appreciable signal attenuation (at least with respect to analog signals) which must be compensated before final addition. The present invention respectively adds signal from two picture points of the same horizontal line and two picture points from a third horizontal line before the summed signals are added to form the four point average signal. The respective pairs of signals in each line are separated by only one subcarrier period and are therefore unlikely to have suffered substantially different attenuation and can therefore be added directly. The Bolger et al. arrangement, on the other hand, as a first step, adds vertically aligned picture points, the signal corresponding to one such point having been delayed by a 2H period and likely to be appreciably attenuated. Thus, before summing, the attenuation of the 2H delayed signal must be compensated and this requires additional circuitry. In the present invention the summed signal from the third horizontal line may be attenuated with respect to the summed signal from the first horizontal line, but this attenuation is easily compensated by including gain in the second ADDER circuit. One other advantage of the present invention is that it lends itself to integration on a single integrated circuit with the 2H delay element realized in charge transfer technology.

DETAILED DESCRIPTION OF THE INVENTION

Figure 1:
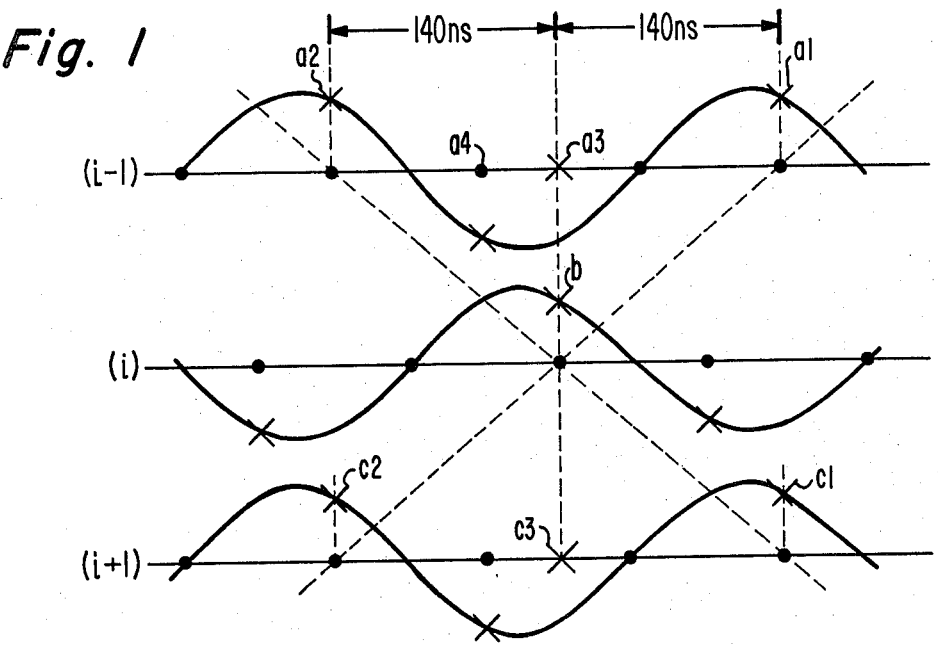
FIG. 1 is a conceptual representation of the relationship of color TV signals representing a portion of three successive image lines.

Referring to FIG. 1, a portion of three successive image lines are illustrated as they would be aligned upon display. Line (i−1) is the line previously traced on the picture screen, line (i) is the line currently being displayed and line (i+1) is the next succeeding line to be displayed. Simultaneous access to the three lines is facilitated by delaying the picture signal by two successive periods, each period being equal to one horizontal image line. Signal delayed or stored by two line periods makes available a signal corresponding to the (i−1) line. Signal delayed one horizontal period corresponds to the (i) line and real time signal corresponds to the (i+1) line.

The respective sinusoidal waveforms represent the color subcarrier signal and illustrate the 180 degree phase relationship line to line for an NTSC TV signal. The large dots on each line represent picture points. The picture points illustrated are not vertically aligned line to line, but the points are aligned every second line. The line to line misalignment is the consequence of (a) assuming the delay elements utilized are sampled data devices, i.e., charge transfer devices and (b) the sample rate is three times the color subcarrier frequency and synchronized therewith. Since the subcarrier is 180 degrees out of phase line to line the picture points occur with a 60 degree offset (46.56 ns for a 3.58 MHz subcarrier). Note, however, if the sample rate were an even multiple of the subcarrier, picture points would be vertically aligned.

From FIG. 1 it can be seen that the points a1, a2, c1 and c2 in the (i−1) and (i+1) lines are in phase with the signal represented by point b in the normally displayed line (i). The time displacement between points a1, a2 and a point a3 vertically aligned with point b is one half a subcarrier period or 140 ns. In a typical luminance signal the percentage of frequency components in the 3 to 4 MHz range is small, therefore it can be presumed that the picture information will not be substantially different between points a2 and a3 or a1 and a3 and that the average of the a1, a2 picture information will approximate the a3 picture point information to a high degree. In addition, since the line to line information is highly redundant, the a1, a2 average will closely approximate the information at point b. Consider the occurrence of a defect in the a1, a2 signal simultaneously with the occurrence of a defect at point b. Substituting the a1, a2 average for the b signal would make no improvement. Thus, the c1, c2 signals are therefore averaged with a1, a2 to diminish the deleterious affect of simultaneous noise in adjacent lines. Considering the high line to line signal redundancy it can be conceptually appreciated that the center of the diagonal broken lines in the drawing will be a reasonable approximation of the a1, a2, c2 and c1 information.

Figure 2:
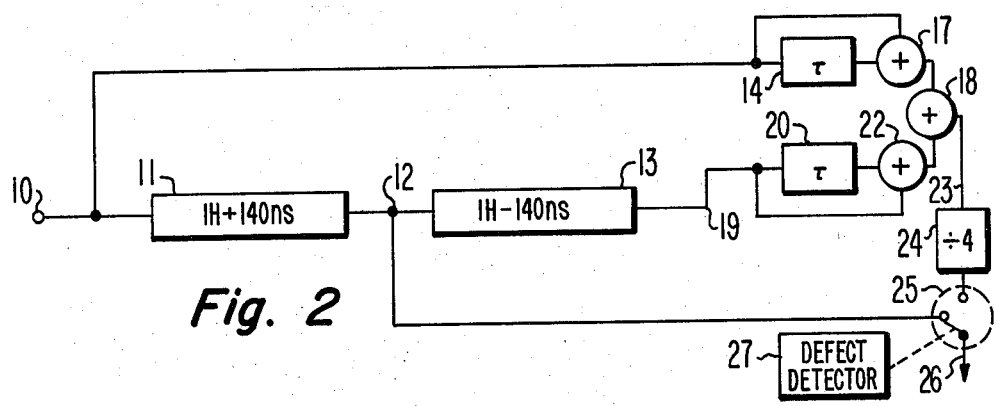
FIG. 2 is a block diagram of a circuit for generating video replacement signals embodying the present invention.

The information averaging is performed by the FIG. 2 circuit. Real time signal is applied to terminal 10. It is delayed 1H plus one-half the color subcarrier period in delay line 11. Signal from delay line 11 at terminal 12 is applied to one terminal of switch 25 and thereafter applied to output terminal 26 for further processing and display. The signal from terminal 12 is the signal normally displayed and corresponds to line (i) in FIG. 1. Signal from delay line 11 is also applied to delay line 13 where it is delayed an additional 1H less one-half the color subcarrier period. It should be appreciated that the color subcarrier at terminal 12 is in phase with the subcarrier at input terminal 10 and output terminal 19 due to the (±) half subcarrier periods included in elements 11 and 13.

Real time signal from terminal 10 is applied to the delay element 14 and ADDER circuit 17. Delay element 14 delays the signal by one color subcarrier period. Signal delayed by element 14 is applied to ADDER circuit 17 to effectuate the addition of two points on one horizontal line, i.e., points corresponding to c1 and c2 of FIG. 1.

Signal delayed two 1H periods at delay line output terminal 19 is applied to delay element 20 and ADDER circuit 22. Delay element 20 similarly delays the signal applied thereto by a one color subcarrier period which delayed signal is applied to ADDER circuit 22 to effectuate the summing of two picture points on one horizontal line delayed by the 2H period corresponding to the points a1 and a2 of FIG. 1.

The respective output signals from ADDER circuits 17 and 22 have a color subcarrier in phase with the signal at terminal 12. The average luminance delay between the ADDER circuit 17 output signal and the signal at terminal 12 is 1H.

The output signals from ADDER circuits 17 and 22 are applied to ADDER circuit 18 where they are summed and subsequently divided by 4 in element 24 to produce the signal average $$\frac{a1 + a2 + c1 + c2}{4}.$$

This average signal is applied to a second terminal of switch 25. Switch 25 under the control of defect detector 27 substitutes the average signal for the normally displayed signal at terminal 26 whenever defects occur in the signal at terminal 12.

In traversing the delay lines the signal at terminal 19 may be attenuated with respect to the signal at terminal 10. To compensate for the attenuation ADDER circuit 17 may be designed to effect a like attenuation on the real time signal or ADDER circuit 22 may incorporate gain.

Figure 3:
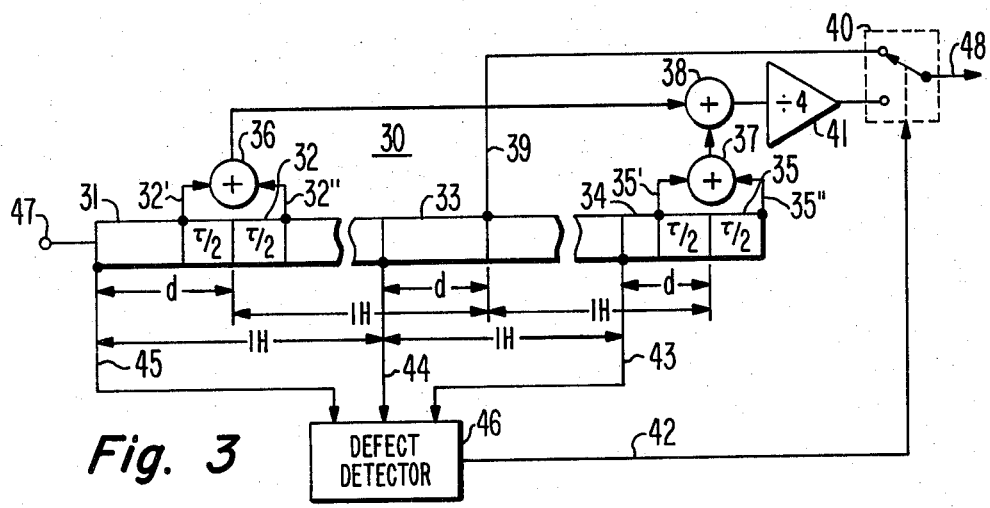
FIG. 3 is a partial block, partial schematic diagram of a second embodiment of the present invention wherein all requisite delay elements are realized in a single contiguous delay element.

The FIG. 3 signal averaging circuit incorporates the FIG. 2 delay elements 14 and 20 integrally with the two 1H delay lines. In the circuit real time video is applied to terminal 47 and defect compensated output video signal is available at terminal 48. Defect detector 46 examines the picture points a3 (line (i−1)), b (line (i)) and c3 (line (i+1)) illustrated in FIG. 1. If the luminance signal level at point b is greater than the signal level at both points a3 and c3 by a prescribed amount a defect is presumed and a pulse generated on connection 42 to activate switch 40 and substitute normally displayed signal on connection 39 with a four point average signal available from the output terminal of circuit 41. The defect detector circuit is the subject of concurrently filed application by F. C. Liu and Y. Kao entitled "Impulse Noise Detection Circuit for TV Signals" and assigned to the common assignee herewith and incorporated herein by reference. Note that while the 3 point defect detector is particularly effective and easily implemented in the illustrated structure other detectors may be utilized in the circuit.

The defect detector 46 is presumed to have an inherent delay or time lag "d" from the occurrence of a signal defect on its input connection 44 to the production of the output control pulse on connection 42. Therefore, it is necessary to provide a substantially equivalent delay in the picture or video signal paths so that a defect in the picture signal on connection 39 does not precede the defect control pulse to the switch 40. In FIG. 3 the delay "d" is interposed between the respective defect detector input terminals 45, 44 and 43 and the circuit points at which signal is accessed for subsequent video processing 32, 39 and 35 (by the delay sections 31, 33 and 34).

In FIG. 3 element 30 is a contiguous serial tapped delay line having an input terminal connected to terminal 47. This device may be practically realized in charge transfer technology and specifically with a charge coupled device (CCD) register. Such devices are constructed with serially connected storage stages with information clocked through each stage by two or more control clocks. Each storage stage is comprised of substages, any one of which may be tapped for accessing signal and thereby permitting access of the signal therein with delay periods which are divided into submultiples of the sampling period.

The large dots along the sides of the register 30 indicate signal taps. An example of a CCD tapping structure is found in U.S. Pat. No. 4,140,923 incorporated herein by reference. Signal applied to the defect detector is tapped at the register input stage (45) and at points corresponding to 1H delay (44) and 2H delay (43) therefrom. Signal for normal display is tapped at a point (39) on the register corresponding to a delay of 1H +d from the defect detector tap at 45. Substitution signal from the preceding image line is tapped from points 35' and 35" corresponding to delays with respect to the tap at 39 of $1H - \tau/2$ and $1H + \tau/2$ respectively where $\tau$ is the period of the color subcarrier. Substitution signal from the succeeding image line is tapped at points 32' and 32". The signal normally displayed from tap 39 is respectively delayed with respect to points 32' and 32" by $1H + \tau/2$ and $1H - \tau/2$.

Signal from taps 32' and 32" are summed in the combining circuit 36, one example of which may be seen in the aforementioned U.S. Pat. No. 4,140,923. Signals from taps 35' and 35" are summed in combining circuit 37. The summed signals from combining circuits 36 and 37 are subsequently summed in combining circuit 38, the resultant being divided in circuit element 41 to produce the four point averaged signal. The averaged replacement signal from element 41 is thereafter applied to the signal substitution switch 40. Note that the entire FIG. 3 circuit lends itself to integration on a single integrated circuit.

What is claimed is:

1. A video signal processing system for providing defect compensation for a color video signal by substituting a replacement color signal for color video signal during the period of a video signal defect comprising:

a source of video signals;

first delay means for delaying said video signal by substantially one television line to provide a first signal;

second delay means coupled to said first delay means, said first and second delay means delaying said video signals by substantially two television lines to provide a second signal;

first combining means coupled to said source of video signals for combining signal therefrom temporally separated by one color subcarrier period, the combined signal being equal in color subcarrier phasing to said first signal;

second combining means responsive to said second signal for combining signals temporally separated by one color subcarrier period, the combined signal from said second combining means being equal in color subcarrier phasing to said first signal, and wherein the first signal is delayed from the combined signal from said first combining means by one television line and the combined signal from said second combining means is delayed from said first signal by one television line;

third combining means for generating a replacement signal proportional to the combined signals from said first and second combining means; and switch means responsive to a defect signal for coupling said replacement signal to a video output terminal, and coupling said first signal to said video output terminal otherwise.

2. An improved signal processing circuit for generating a defect substitution signal for replacing portions of color video signals having noise or dropouts therein, said color video signal including a color subcarrier and having the signal segmented into image lines comprising:

a signal input terminal for applying video signal;

a first delay element having an input terminal connected to said signal input terminal and having an output terminal, said first delay element delaying said video signal by a period substantially equal to one image line plus one-half the color subcarrier period;

a second delay element having an input terminal connected to the output terminal of the first delay element and having an output terminal, said second delay element delaying said video signal by a period substantially equal to one image line less one-half the color subcarrier period;

a third delay element having an input terminal connected to said signal input terminal and having an output terminal, said third delay element delaying said video signal by a period equal to one subcarrier period;

a fourth delay element having an input terminal connected to the output terminal of the second delay element and having an output terminal, said fourth delay element delaying said video signal by one color subcarrier period;

first and second adder circuits having respective first input terminals connected to the input terminals of the third and fourth delay elements respectively and having respective second input terminals connected to the output terminals of the third and fourth delay elements respectively and having respective output terminals;

further circuitry having first and second input terminals connected respectively to the output terminals of the first and second adder circuits for generating at an output terminal thereof a signal proportional to the sum of the signals available from said adder output terminals; and switch means responsive to a defect signal for applying signal from said further circuitry output terminal to a video output terminal, and applying signal from the first delay means output terminal to said video output terminal otherwise.

3. A video signal processing system for providing defect compensation for a color video signal by substituting a replacement color signal for the color video signal during the period of a defect comprising:

a source of video signals;

a tapped delay line having an input terminal coupled to said source of video signals, said delay line delaying video signal by at least two television lines plus one color subcarrier period and having first, second, third, fourth and fifth signal taps for respectively accessing video signal delayed from the first tap nearest the input terminal by one color subcarrier period, one television-line plus one-half color subcarrier period, two television lines, and two television lines plus one color subcarrier period;

first combining means for summing video signal from the first and second taps to produce a first summed signal;

second combining means for summing video signal from the fourth and fifth taps to produce a second summed signal;

third combining means for generating a replacement signal proportional to the sum of the first and second summed signals; and switch means responsive to a defect signal for coupling said replacement signal to a video output terminal and coupling video signal from said third tap to said video output terminal otherwise.

* * * * *